C. W. PARKER.
BEARING FOR ELECTRIC MOTORS AND GENERATORS.
APPLICATION FILED DEC. 10, 1918.
1,317,818.
Patented Oct. 7, 1919.
2 SHEETS—SHEET 1.
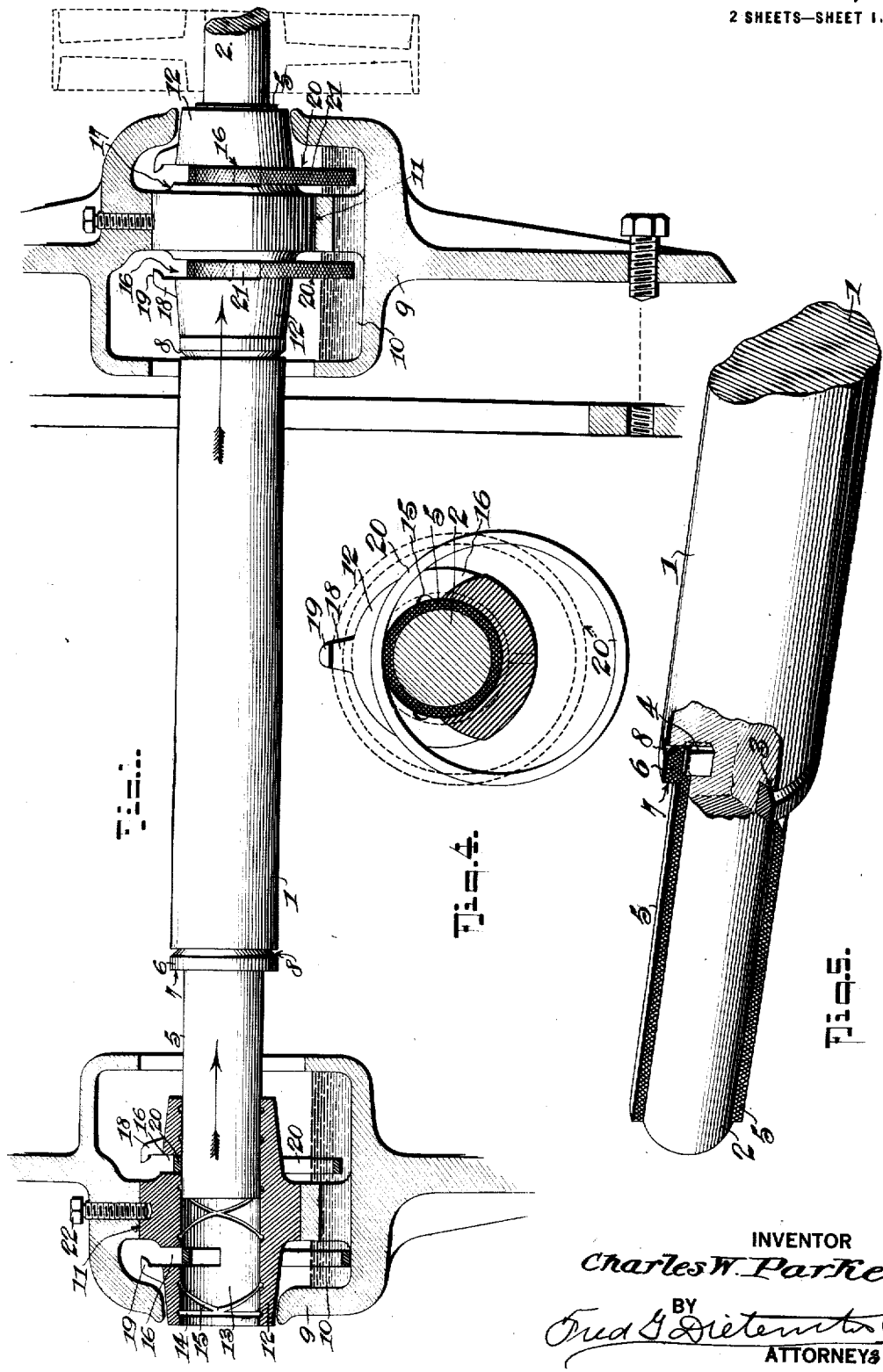
INVENTOR
Charles W. Parker.
BY
Fred G. Dieterich Co
ATTORNEYS C. W. PARKER.
BEARING FOR ELECTRIC MOTORS AND GENERATORS.
APPLICATION FILED DEC. 10, 1918.
1,317,818.
Patented Oct. 7, 1919.
2 SHEETS—SHEET 2.
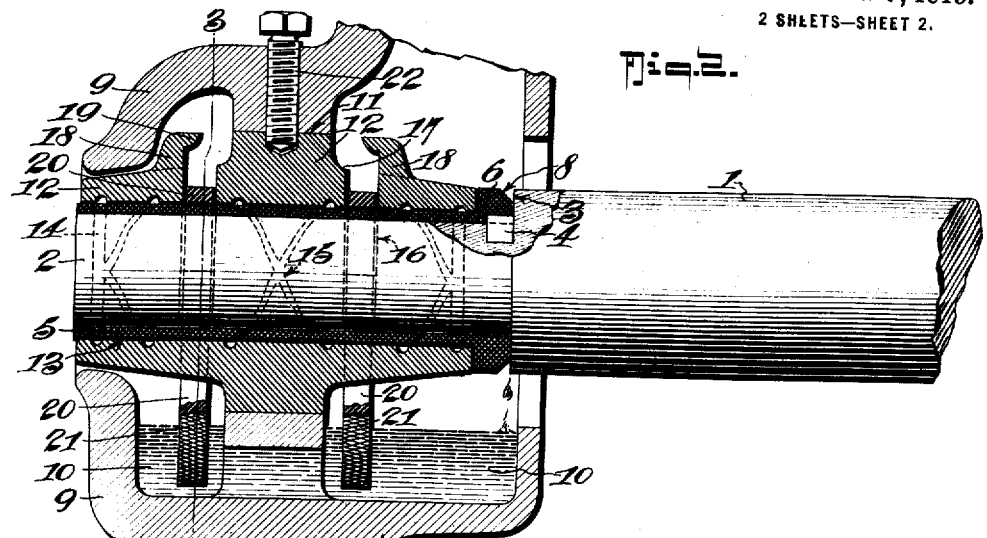
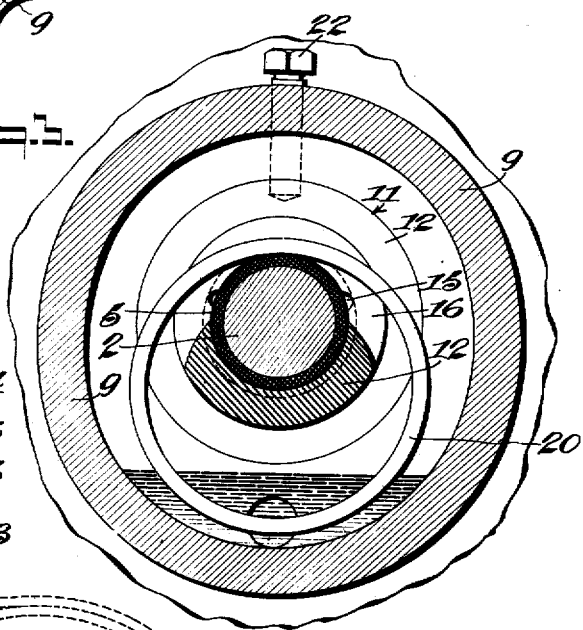
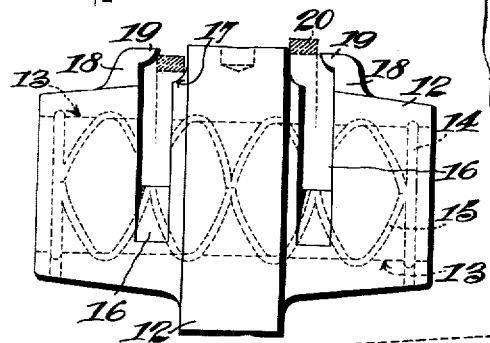
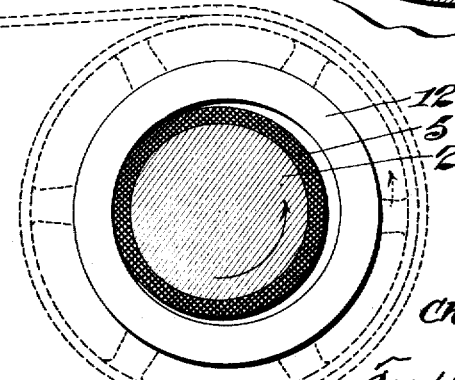
INVENTOR
Charles W. Parker
BY
ATTORNEYS

UNITED STATES PATENT OFFICE.

CHARLES WM. PARKER, OF OMAHA, NEBRASKA.

BEARING FOR ELECTRIC MOTORS AND GENERATORS.

1,317,818.　　　　Specification of Letters Patent.　　Patented Oct. 7, 1919.

Application filed December 10, 1918. Serial No. 266,101.

*To all whom it may concern:*

Be it known that I, CHARLES W. PARKER, a citizen of the United States, at present residing at Omaha, in the county of Douglas and State of Nebraska, have invented certain new and useful Improvements in Bearings for Electric Motors and Generators, of which the following is a specification.

My invention relates to the art of electric motor and generator constructions and it particularly relates to the bearings for the shaft of the rotator or rotary element.

The present common practice in the construction of electric motors and generators is to make the armature shaft of steel and to provide bronze or Babbitt or other similar metal softer than the revolving steel shaft bearings in the stationary frame or end bells of the housing, in which the shaft revolves.

The steel shaft, in use, tends to wear the bearings at a particular point, which is determined by the direction of the belt pull or pressure by driving gear, as the case may be.

This stress causes the bearings to wear in an oval shape, thereby not only throwing the rotator out of "true" and causing, in time, a wearing contact between the rotator and the stator, which causes injury to the insulation and consequent burning out of the motor, but also increasing the friction in the bearings (thus reducing the efficiency of the machine as a whole) and causing, in many cases, the shaft to wear to such an extent that it has to be machined and turned and trued before new bearings can be made.

When it becomes necessary to make new bearings, it changes the dimensions of the shaft from standard. Furthermore, in addition to the machine work on the shaft, it is also necessary to bush the pulley or gear that was fastened on the shaft, so that the same can be replaced thereon, and it is also necessary to replace the stationary bearing with another bearing, the hole of which is true and of a reduced diameter, made necessary by the cutting down of the shaft to the lesser dimension in truing the same.

To remove the bearing from the housing or end bells of present day electric motors and generators, in many cases, require special bolts and steel washers or other tools to draw or "pull" the bearings out of the end bells or housing in which they are usually fitted with force.

Thus it is not only an expensive and tedious job to refit a motor unit bearing (or that of a generator) but it leaves the machine out of use for a considerable length of time.

Again, in the old practice, where it is necessary to turn down the worn shaft end and fit a bearing in the end bell or housing of less diameter than that of the shaft, the bearing surface area is proportionately reduced, thus throwing a greater bearing strain on the refitted shaft and bearing than the original design of the machine called for and consequently the danger of burning the bearings and wear on the same and the shaft is proportionately increased.

My present invention particularly has for its object to avoid the objections above noted and to provide a bearing in which adequate provision is made first for proper and effective lubrication, so as to reduce the wear to the lowest possible degree, and secondly provision is made, whereby, when it does become necessary to "true up the bearings" or to take care of the wear in the same, it can be done in a minimum of time with minimum effort and at minimum expense.

To this end, therefore, my invention provides a bearing wherein the construction of the steel shaft and its size remain, at all times, standard, the end bells or housings remaining the same as in present practice but the bearings, which are sustained by the end bells or housings, are made of steel, case hardened, and provided with rifle oil channels inside of the same and also provided with sockets or slots and a guard for holding oil rings in place to bring oil from the bearing reservoir to the bearing surfaces; the steel shaft is provided with a bronzed sleeve (or other similar metal softer than the case hardened steel outer bearings) which sleeve is forced onto the steel shaft with a neat fit and it has a thrust collar, at its inner end, which is provided with a covered key groove to fit a key on the shaft, the shaft having a shoulder against which the collar of the sleeve fits and the latter having its adjacent edge beveled to form, in connection with the shaft shoulder, an oil "throw-off" groove to prevent oil siphoning out of the bearing and creeping to the armature windings.

The invention also resides in those novel features of construction, combination, and arangement of parts, all of which will be first fully described and then be specifically pointed out in the appended claims, reference being had to the accompanying drawings, in which:

Figure 1 is a vertical longitudinal section and part elevation showing my invention and illustrating the manner of removing the shaft for replacement of sleeves.

Fig. 2 is an enlarged vertical section of the housing or end bell, its steel insert bearing and the steel shaft, the shaft being shown in elevation with parts broken away.

Fig. 3 is a cross section on the line 3—3 on Fig. 2, looking in the direction of the arrow.

Fig. 4 is a detail cross section on the line 3—3 on Fig. 2, looking in the direction opposite that of the arrow.

Fig. 5 is a detail perspective view with parts in section of the shaft and its removable sleeve.

Fig. 6 is a side elevation of the end bell or housing bearing element, the manner of inserting the oil rings into the slots being indicated.

Fig. 7 is a diagrammatic view illustrating the wearing tendency of motor bearings.

In the drawings in which like numerals and letters of reference designate like parts in all the figures, 1 represents the shaft which has a reduced end 2 to provide shoulders 3, adjacent to which are keys 4.

5 indicates a bearing sleeve of a material which is of lesser hardness than that of the bearing surface with which it coöperates, so as to take the wear of the bearing. The sleeve 5 is fitted onto the shaft end 2 with a tight or snug fit and it is provided with a collar or head 6 of greater diameter than the sleeve, to form a shoulder 7, to take the end thrust of the shaft against the outer bearing member, the collar 6, where it abuts the shoulder 3, having its edge beveled, as at 8, whereby creeping oil, when it reaches the groove formed by the bevel 8, will be thrown off by the centrifugal action of the rotation of the shaft and returned to the reservoir 10 without creeping along the main portion of the shaft and getting into the windings of the armature.

It will be observed that the key 4 is of a predetermined length, less than the length of the collar 6. The purpose of this is to allow for end thrust wear on the collar 6 to take place without the key 4 coming into engagement with the end of the outer bearing member, in the event that the sleeve 5 becomes worn to such an extent that the key 4 will project radially a greater distance than the outer or worn surface of the sleeve 5. This is important for the reason that the sleeve 5 may wear down very thin and, in fact, so far as to practically consume it before replacement is absolutely necessary.

In that event, the key 4 would project beyond alinement with the hole of the outer bearing and, if no provision were made to allow for the end thrust wear to the proper degree, the key 4 would scratch or scrape the end of the outer bearing and damage it to such an extent that its end face would have to be turned down again to provide a smooth bearing surface and this is to be avoided, since it is one of the principal objects of my invention to avoid the necessity of removing the outer or fixed bearing from the end bell or housing and to avoid the necessity of doing any work on that bearing in order to make replacements.

9 designates the end bell or housing which is provided with an oil reservoir 10 and is bored at 11 to receive the outer bearing 12, the outer bearing 12 being of steel, case hardened, so as to wear to little or no extent. The bearing 12 is bored at 13 for the sleeve 5 and is provided with end oil stopping annular grooves 14, those at one end communicating with those at the other end through rifle grooves 15, see Figs. 1 and 6.

16 designates slots which are spaced a predetermined distance from the central or sustaining portion of the bearing and are adapted to receive oil rings 20 (whose outer surfaces are knurled as at 21) which lie on the sleeve 5 and, through the rotation of the shaft, are turned to carry the oil from the reservoir 10 to the bearing surface of the sleeve 5, which, in turn, distributes it, through the oil grooves, to the bearing surfaces.

In order to prevent the rings 20 from throwing off, I provide lugs 18 which project over the slots 16 slightly, as at 19, the surface of the bearing between the slot 16 and the central sustaining portion being rounded or beveled as at 17, so that in inserting the rings, they may be easily slipped in under the lugs 19, as indicated in Fig. 6.

It will be observed that by my construction and arrangement of parts, the wear on the bearings is reduced to the minimum through effective lubrication and adequate provision is made to take care of any end thrust (which is always slight when compared to the bearing wear due to rotation), so that, when wear does occur, all danger of injuring the outer bearing is avoided, it being understood that the purpose of the key 4 is to lock the sleeve 5 against rotation on the shaft 1.

Now, in order to replace a worn bearing, with my construction of parts, it is not necessary to remove the fixed bearing 12 from the end bell or housing in which it is shrunk or secured by being driven into place with a very tight fit and held against rotation by a set screw 22 or other suitable means. It is only necessary to unbolt one end bell and pull the shaft and armature out of the housing, thus bringing the shaft 1 with both of the sleeves 5 (one at each end) where they can be handled.

The pulley or gear on the extended end of the shaft 2 (indicated in dotted lines in Fig. 1) is taken off and the shaft 1 pulled out from the bearing of the end bell, which has been removed.

The sleeves 5 are then driven off by the application of a suitable tool in the groove formed by the shoulder 3 and bevel 8 and new sleeves 5 are put in place, after which the parts are reassembled in the reverse order of that above mentioned and the motor will be ready for use again, it being understood that the pulley or gear is replaced on the shaft without the necessity of any machine work or rebushing.

In practice, an extra set of sleeves 5 can be furnished with each motor or generator, so that, if at any time, it is necessary to replace the sleeves, it can be done with minimum shut down of the motor or generator.

It will be seen that, with my construction, labor, expense and time necessary to effect a repair or replacement of motor bearings is reduced to a minimum and where the bearings are used on generators which require constant running, the time saved in making the repairs is a great factor, since it frequently occurs, especially in small power plants, that a shutting down of a generator puts the entire system out of commission for the time being.

From the foregoing description taken in connection with the drawings, the construction and advantages of my invention will be clear to those skilled in the art.

What I claim is:

1. A bearing for electric motors and the like, which comprises in combination with the shaft having a shoulder, a stationary bearing member, said shaft and said bearing member being composed of hardened metal, and a bearing sleeve of softer metal tightly fitted on the shaft and itself having a shouldered collar engaging the shaft shoulder and the end of the stationary bearing member, and a key in the shaft engaging in a groove in the collar to cause the shaft and sleeve to turn together, said sleeve being designed to take the wear of the bearing.

2. A bearing for electric motors and the like, which comprises in combination with the shaft having a shoulder, a stationary bearing member, said shaft and said bearing member being composed of hardened metal, and a bearing sleeve of softer metal tightly fitted on the shaft and itself having a shouldered collar engaging the shaft shoulder and the end of the stationary bearing member, and a key in the shaft engaging in a groove in the collar to cause the shaft and sleeve to turn together, said sleeve being designed to take the wear of the bearing, the end of said sleeve which is adjacent to the shaft shoulder being beveled to act, in coöperation with said shaft shoulder, as an oil throw-off, and means for supplying a lubricant to the bearing surfaces of said sleeve and stationary bearing member.

3. A bearing for electric motors and the like, which comprises in combination with the shaft having a shoulder, a stationary bearing member, said shaft and said bearing member being composed of hardened metal and a bearing sleeve of softer metal tightly fitted on the shaft and itself having a shouldered collar engaging the shaft shoulder and the end of the stationary bearing member, said collar having a groove of less length in the direction of the axis of the sleeve than the thickness of the collar, and a key in the shaft engaging in the groove of the collar to cause the shaft and sleeve to turn together, said sleeve being designed to take the wear of the bearing.

CHARLES WM. PARKER.